United States Patent [19]
Gordon

[11] Patent Number: 5,409,371
[45] Date of Patent: Apr. 25, 1995

[54] OXYGEN WELDING AND INCORPORATING A NOVEL GAS SEPARATION SYSTEM

[75] Inventor: Arnold Z. Gordon, Beachwood, Ohio

[73] Assignee: IGR Enterprises, Inc., Cleveland, Ohio

[21] Appl. No.: 183,162

[22] Filed: Jan. 18, 1994

Related U.S. Application Data

[60] Division of Ser. No. 821,458, Jan. 15, 1992, Pat. No. 5,332,483, which is a continuation of Ser. No. 549,467, Jul. 6, 1990, abandoned.

[51] Int. Cl.⁶ .............................................. F23Q 2/32
[52] U.S. Cl. ..................................... 431/127; 431/356
[58] Field of Search ........................... 228/234.1, 902; 431/127, 356

[56] References Cited

U.S. PATENT DOCUMENTS

| | | | |
|---|---|---|---|
| 4,081,656 | 3/1978 | Brown | 219/137.31 |
| 4,462,891 | 7/1984 | Lawless | 204/427 |
| 4,636,291 | 1/1987 | Divisek et al. | 204/283 |
| 4,879,016 | 11/1989 | Joshi | 204/242 |

*Primary Examiner*—Kathryn Gorgos
*Attorney, Agent, or Firm*—Niblack & Niblack

[57] ABSTRACT

An oxygen welding apparatus capable of generating its oxygen needs without an external oxygen source from a self-contained solid state electrolytic cell which separates oxygen from the air. The cell employs a flexible, ductile ceramic composite as the solid electrolyte. The ductile ceramic composite electrolyte comprises a continuous, ordered, repeating, interconnected ductile metallic array substantially surrounded by and intimately integrated within a ceramic matrix. The cell is connected to a power supply so when current is passed through the cell, oxygen or nitrogen is separated from the air passing through the cell.

5 Claims, 7 Drawing Sheets

ELECTRICAL POWER

OXYGEN WELDING AND INCORPORATING A NOVEL GAS SEPARATION SYSTEM

This application is a divisional of allowed application Ser. No. 07/821,458, filed Jan. 15, 1992, which issued as U.S. Pat. No. 5,332,483 on Jul. 26, 1994, which is a continuation of application Ser. No. 07/549,467, filed Jul. 6, 1990, now abandoned.

BACKGROUND OF THE INVENTION

The present invention relates to the separation of the oxygen and nitrogen from air, and more particularly relates to gas separation means employing a novel solid state ceramic composite electrolyte.

Oxygen has a broad range of medical, industrial and experimental uses. Most of the oxygen generating apparatus provided by the prior art is voluminous and heavy due to the use of high pressure gas cylinders as the oxygen supply source.

In recent years, there have been attempts to provide compact and lightweight oxygen generating systems that can supply oxygen gas for extended periods. Japanese Utility Model Publication No. 26445/1980 discloses an oxygen gas generating system adapted to catalytically decompose aqueous hydrogen peroxide using a manganese compound as the Catalyst. This system has several drawbacks. The decomposition reaction aqueous hydrogen peroxide and manganese dioxide proceeds at an explosively high rate if the volume of hydrogen periodixe is not carefully controlled. If the volume and rate of the hydrogen peroxide reservoir is decreased to make the unit portable, the hydrogen peroxide is rapidly consumed and the reservoir must be replaced frequently. For both reasons, this is not a practical approach.

Japanese Patent Publication No. 42115/1977 employs a platinum catalyst capably of decomposing aqueous hydrogen peroxide at a high concentration. This system is also unsatisfactory, both because it requires a reservoir of hydrogen peroxide which must be periodically replaced, and because of the expense and nature of the precious metal catalyst. One problem with this approach is that the usual pore size of the alumina or silica gel catalyst support is too small to permit penetration of the hydrogen peroxide. A major drawback is that the expensive catalyst has a limited life. A further drawback is the precise temperature control required.

One attempt to address the problems with hydrogen peroxide based oxygen generating systems is disclosed in Japanese Patent Publication No. 49843/1981 in which a system is provided for controlling the flow rate of hydrogen peroxide by valve adjustment using a link mechanism to control the supply of aqueous hydrogen peroxide depending upon the pressure of the generated oxygen gas. However, the proposed system for converting the gas pressure into mechanical displacement and transmitting the displacement by means of the link has the drawback of being unable to rapidly respond to the change in the reaction rate with resulting failures due to corrosion and abrasion in the actuating system.

U.S. Pat. No. 4,792,435 discloses a system for produceing oxygen by catalytic decomposition of aqueous hydrogen peroxide employing a platinum group catalyst carried on a highly porous sintered ceramic support of large pore size. This system again suffers from the drawback of requiring a hydrogen peroxide reservoir which must be periodically recharged or replaced.

U.S. Pat. No. 4,784,765 provides an aquarium oxygen generator comprising a container inverted into the apex or a ceramic cone-shaped ceramic structure resting on the floor of an aquarium. Hydrogen peroxide solution (15%) in the containiner is decomposed to form oxygen and water in the presence of a catalyst pellet of finely divided silver admixed with clay. Hydrogen peroxide seeps into the cone, and in the absence of the catalyst, reacts with organic material in the water to produce oxygen which bubbles through an aperture in the side of the cone-shaped structure into the main body of water in the aquarium. While this system may be satisfactory for a small scale aquariium, it suffers from the drawback of requiring a hydrogen peroxide reservoir and is not suitable for medical, industrial and experimental uses.

The present invention solves the problems of the prior art and provides a system which generates oxygen or nitrogen from air, can be scaled up or down in size depending upon use, does not require consumables such as hydrogen peroxide or catalysts which must be replaced, and which is efficient and cost effective. The system of the present invention is based on a novel, flexible and mechanically rugged, thin, solid state electrolyte ceramic composite.

Ceramics generally possess a number of desirable properties, including markedly high resistance to abrasion, heat and corrosion compared to metallic materials. Certain ceramics, such as stabilized bismuth solid oxides, stabilized ceria solid oxides and zirconia solid oxides are ionically conductive materials suitable for use as solid electrolytes. However, due to extreme brittleness, their application has been limited despite their other excellent properties.

A number of attempts have been made to increase toughness of ceramic materials by compounding them with another material including ceramic or metal whiskers such as silicon carbide whiskers. Composites with ceramic matrices and ductile metal inclusions such as those produced by Lanxide Corporation show high fracture toughness when compared to ordinary ceramic materials. See for example U.S. Pat. Nos. 4,824,622; 4,847,220; 4,822,759; 4,820,461; and related 4,871,008. These composites are a chaotic, generally discontinuous, random metal dispersion in a ceramic composite body. They are prepared by a slow controlled oxidation of molten aluminum to alumina oxide, leaving behind approximately 5% of the parent metal. See also C. A. Anderson et al., *Ceram. Eng. Sci. Proc.*, 9 [7-8] pp. 621–626 (1988); and M. S. Newkirk et al., *Ceram. Eng. Sci. Proc.*, 8 [7-8] pp 879–885 (1987).

P. Ducheyne et al., J. Materials Science 17(1982) 595–606 discloses a bioglass composite produced by immersing premade porous fiber skeletons into molten bioglass to prepare metal fiber reinforced bioglass. These porous fiber skeletons produce random, chaotic, disordered support matrices and the process is applicable only to bioglasses.

U.S. Pat. No. 4,764,488 discloses a high toughness ceramic composite of the fiber-reinforced type wherein metal fibers having the shape of triangular waves forming bent portions alternating on the opposite sides with an angle O of the bent portions in a range between 60° and 165° and a d/H ration of between 0.025 and 0.6. While the discrete, discontinous fibers, unidirectionally anchored fiber reinforcement employed in the 488 patent improve the toughness of the ceramic, this technique does not solve the problem of crack propagation and ultimate failure.

U.S. Pat. No. 4,776,886 discloses a whisker-reinforced ceramic matrix composite comprising a principal crystal phase selected from the group consisting of anorthite, barium-stuffed cordierite and mixed cordierite/anthorite prepared by extrusion of ceramic batches comprising an extrusion vehicle and a solid component comprising essentially inorganic whiskers and powdered glass.

The novel composite employed in the practice of this invention is mechanically tough. When subjected to intentionally severe mechanical stress, such as bending a sheet in half and restraightening it, the crack that resulted was limited to the stress or fold line.

This tough, ductile solid electrolyte composite permits the construction of a gas separation device in which the only moving part is the air intake fan, and which does not require consumables such as hydrogen peroxide or catalysts requiring constant replenishment.

SUMMARY OF THE DISCLOSURE

The present invention provides a solid state device for separating oxygen or nitrogen from air comprising a solid state electrochemical cell wherein the solid electrolyte is a ductile composite comprising a continuous, ordered, repeating ductile metallic array surrounded by and supporting an ionically conductive ceramic matrix. The preferred form of the solid electrolyte is planar structure which can be fabricated into various configurations such as tubes, arcuate sections, corrugated structures or flat plates. Means are provided for connecting the cell to a power supply whereby when current is passed through the cell, oxygen or nitrogen is separated from air passing through the cell.

DETAILED DESCRIPTION OF PREFERRED EMBODIMENTS

Figure 1:
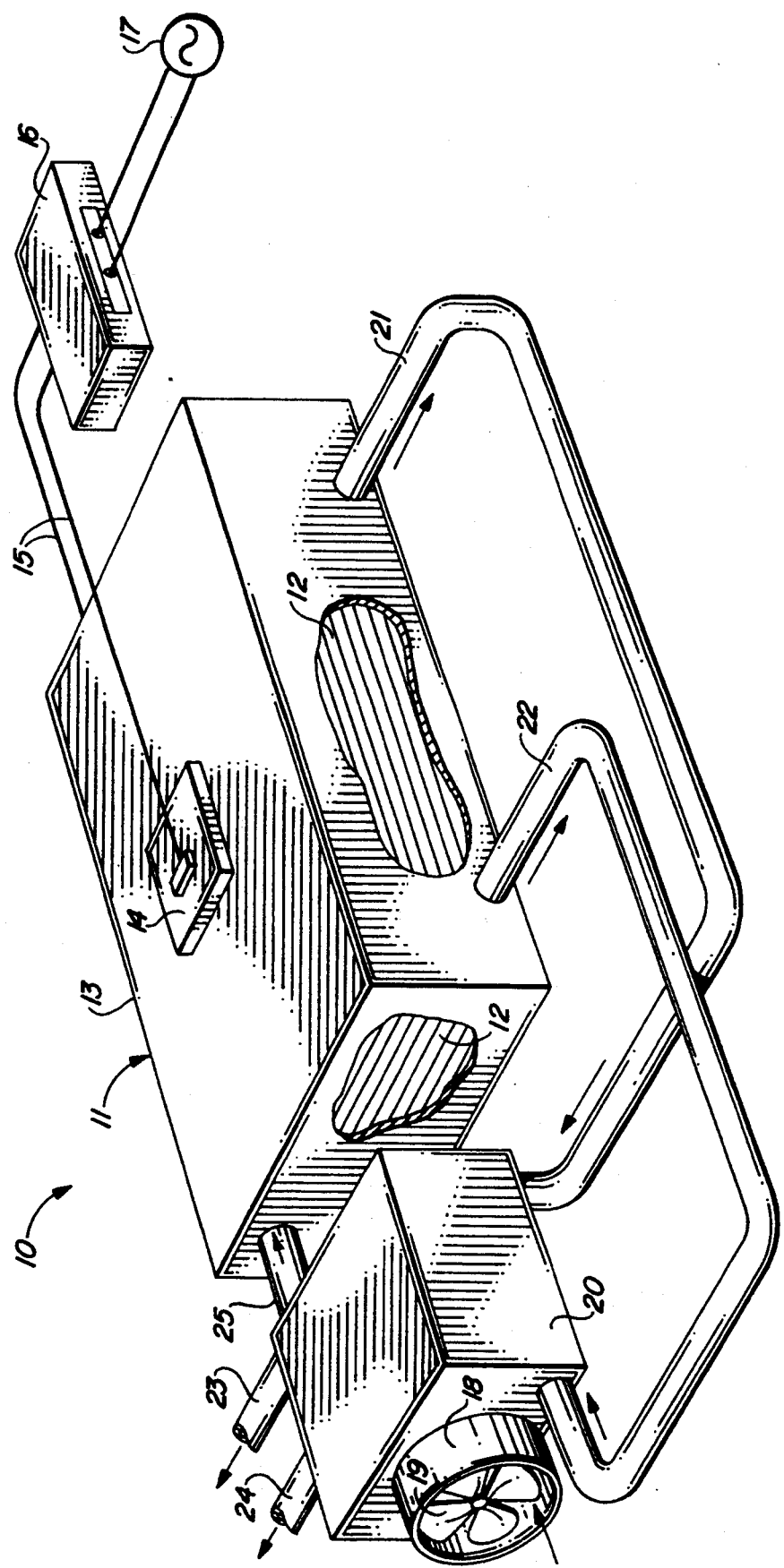
FIG. 1 is an perspective view of one preferred oxygen generator embodiment in accordance with the present invention with portions cut away for clarity and understanding.

Referring to FIG. 1, depicting one preferred embodiment, oxygen generator 10 comprises oxygen separator module 11. Oxygen separator module 11 comprises one or more individual solid electrolyte composite cells 30 (FIG. 3), placed in multiple plate stacked form 12, as shown in this view. In this preferred embodiment, the plurality of solid electrolyte cells are placed in modular stack array in which the individual solid electrolyte cells are electrically connected in series. Bipolar stack housing 13 carries electrode connector unit 14. Power control unit 16 may be disposed between power source 17 and the oxygen separator module by current conductors 15. The oxygen separator unit may either be battery powered or plugged into a central remote generation source.

In operation, air is drawn into intake unit 18 by air collection fan 19. The air is heated in heat exchanger 20 and travels into oxygen separator module 11, via preheated air intake line 25, where it is separated into oxygen and oxygen depleted air. The oxygen is drawn from oxygen separation module 11 via oxygen conduit 21. Oxygen depleted air exits module 11 through conduit 22. The hot air and oxygen are passed through the heat exchanger, and the resulting cooled oxygen product exits through tube 23 while the cooled depleted air is released through vent 24.

Figure 2:
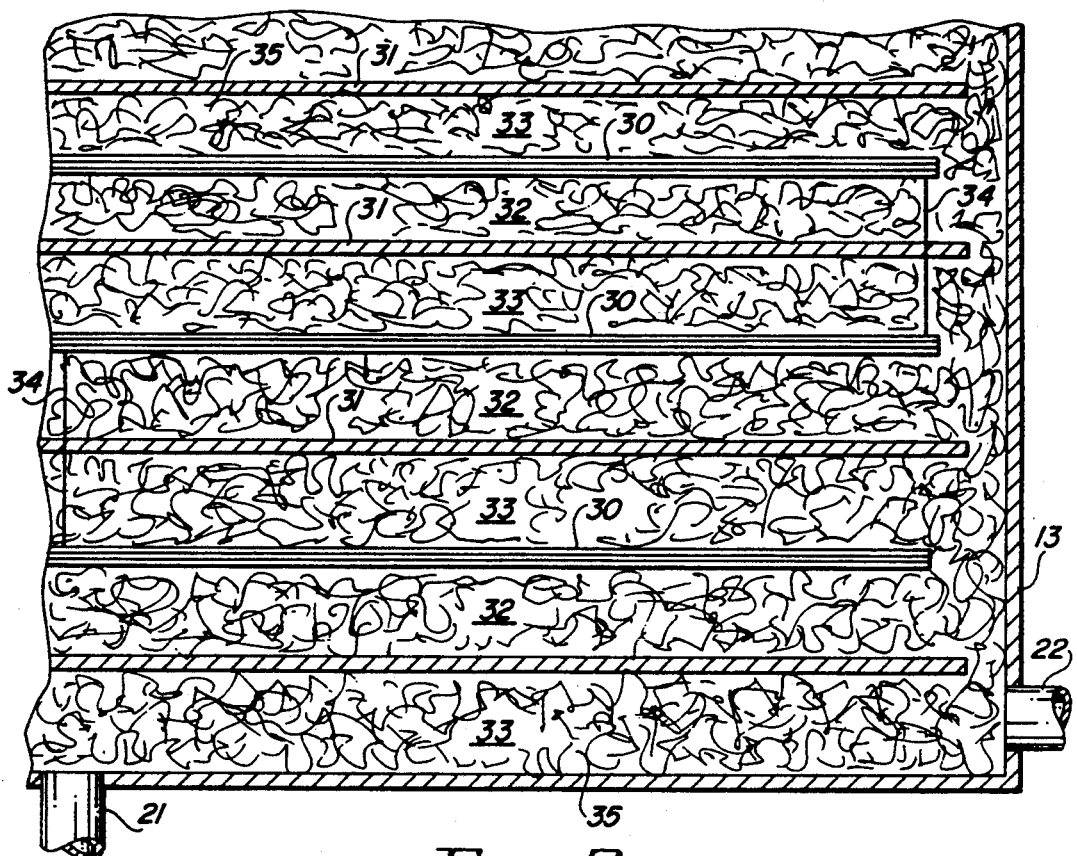
FIG. 2 is a fragmentary, cut-away elevation view showing greater detail of an electrolytic cell stack within the oxygen generator assembly.

Referring to FIG. 2, the interior detail of the electrolyte plates and plenum chambers within electrolyte stack housing 13 is shown. Plates 30, shown in parallel sheet arrangement, are electrically connected in series to each another by connectors 34. While these are depicted as separate elements in this view, fabrication may be simplified by having the plates formed in block I cross-sectional form so that each contacts those adjacent, with the end plate then having a block C cross section. Plenum chamber walls 31 are positioned on each side of all electrolyte plates in horizontal relationship so as to form a continuous stack within the housing. The plates are energized by the application of current.

Chamber walls 31 together with plates 30 form air plenum chamber 33 and oxygen plenum chamber 32. The chambers are continuous through housing 13 and are gas isolated from one another. Spanning the chambers are current pickups 35 formed of electronically conductive material such as metal structures fabricated in the form of wool, expanded metal pieces, posts, rods, channels, ribbons or mesh which serve to pass current across the chambers but do not unduly impede gas flow. In operation, preheated air enters the top of the stack into chamber 32 at a temperature generally slightly above 600° C. Oxygen within the air is transported in the form of oxide ions through the solid electrolyte plate and into the opposing oxygen plenum chamber 33. All air plenum chamber segments in the housing are gas parallel while all oxygen plenum chamger segments are likewise in gas parallel to one another and gas isolated from the air plenum. During passage of gases through the stack, application of a current causes a temperature increase, stabilizing typically at a temperature of from 600° to 700° C.

Oxygen which has been transported through each electrolyte plate 30 as the oxide ion collect in the oxygen plenum chamber on the opposing sides of the plates. Pressure build up from the transport of oxygen into the plenum chamber units causes oxygen flow to commence. The oxygen depleted air and the oxygen gas travel separately in gas parallel through the module and are conducted into the heat exchanger 20 through conduits 21 and 22 where cold air collected through intake unit 18 (FIG. 1) is heated by the depleted air which is then vented, and by the oxygen product gas which is cooled in the heat exchanger and collected.

During normal operation, the system usually requires no supplemental heat addition but runs at steady temperatures. An auxiliary heater, preferably located in the heat exchanger, may be required during start up until steady operating temperatures are achieved.

The plenum walls are formed of material that is electrically conductive and will withstand exposure to heated oxygen without being unduly oxidized. Preferred materials include 300 series stainless steel, 400 series stainless steel, Incolloy 800 HT, super alloys including Inconel 600 or 601 and Haynes 214.

In spacing the walls and electrolyte plates in stacked arrangement, as depicted, it is advantageous to have the height of the air plenum chamber units greater than that of the oxygen plenum chamber. This is to accommodate the larger volume of air passing through the module, compared to the small volume of oxygen being withdrawn. A ratio of 2:1, air plenum to oxygen plenum has been found to be quite suitable. Increasing the height of the chambers has the advantage of reducing pressure drop caused by the packing, but it has the disadvantage of increasing the overall size of the stack.

Figure 3:
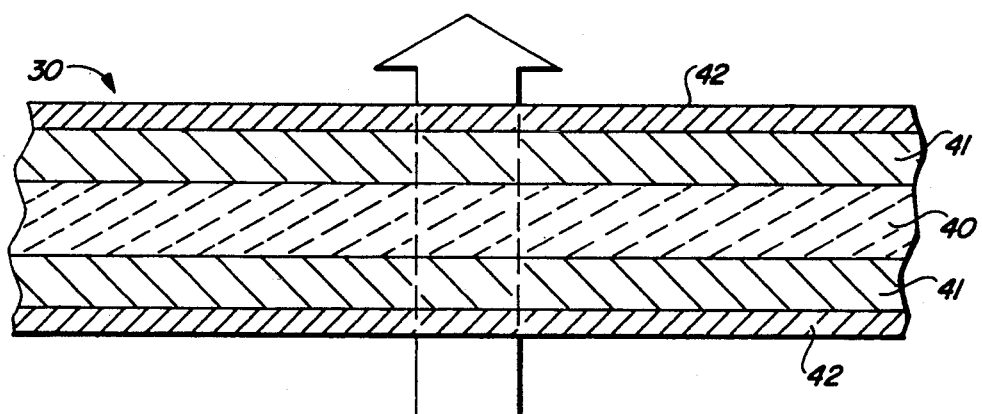
FIG. 3 is an enlarged elevation side view of a ductile ceramic multilayered single electrolytic cell unit employed in the oxygen generator assembly of FIG. 1.

The current pickups 35 within the plenum chambers contact the electrodes and the bipolar plates to avoid short circuits within the stack. Electricity passes throught the plenums perpendicular to the gas flow which is horizontal. The pickups are suitably composed of the same materials as that used to form the plenum walls 31. While good electrical contact is needed to avoid undue voltage drop, the more porous the pickups are, or the less resistance they offer to gas flow, the better they operate by lessening restriction of gas flow and avoiding excessive pressure drop through the chambers. FIG. 3 depicts in large scale the layers forming the cell 30 which is the essential component of this invention. Solid electrolyte ductile ceramic composite 40 is the center layer of the cell. It is preferably sandwiched between mixed conductor layers 41 formed of solid electrolyte doped with multi-valent ions which make the layers both ionically and electronically conductive. The mixed conductive layers 41 are coated with electrically conductive gas porous electrode thin layers 42 which form an anode and a cathode on the surface of the cell.

The mixed conductor component 41 is formed of a solid electrolyte such as bismuth oxide or zirconia. The multi-valent doping materials which are suitable include praseodymium, terbium, cesium, iron and chromium.

The electrically conductive electrode surfaces on each side of the cell are preferably silver, silver alloys or conductive oxides such as perovskites.

The ductile, tough solid electrolyte ceramic composite employed in the practice of the present invention comprises a regular, ordered, continuous, repeating array of ductile intersupported or interconnected, metallic fibers in intimate contact with the ceramic matrix so as to be substantially surrounded or embedded within it and supporting the matrix. The ceramic employed in the practice of this invention is a highly ionically conductive material. Preferred ceramic phase materials in which the fibers are embedded are solid oxide electrolytes based on solid solutions of bismuth oxide and a second component selected from a metal oxide wherein the metal ion has a valence of +2, +3, +5, or +6. The purpose of the stabilizing agent is to hold the bismuth oxide in the preferred crystal lattice symmetry in a temperature range at which it would otherwise convert to a less conductive, or non-conductive polymorph. In general, the optimum lattice symmetry is face centered cubic. However, the alkaline earths form rhombohedral phases with bismuth oxide and these phases are also extremely conductive.

Table I is a partial list of bismuth solid oxide electrolytes which may be employed in the practice of this invention.

TABLE I

Bismuth Solid Oxide Electrolytes

| Doped-Oxide | Electrolyte | $\Omega^{-1}$ cm$^{-1}$ at 450° C. ($\times 10^3$) | E/E° @ T °C. | Reference |
|---|---|---|---|---|
| Niobium | $(Bi_2O_3)_{0.85}(Nb_2O_5)_{0.15}$ | 3.5 | 0.98 @ 600 | JES, 124, 1563 (1977) |
| Vanadium | $(Bi_2O_3)_{0.875}(V_2O_5)_{0.125}$ | 1.8 | 0.97 @ 600 | JES, 124, 1563 (1977) |
| Yttrium | $(Bi_2O_3)_{0.75}(Y_2O_5)_{0.125}$ | 3.2 | 0.98 @ 550 | JAE, 5, 187 (1975) |
| Yttrium | $(Bi_2O_3)_{0.80}(Y_2O_5)_{0.20}$ | 12 | | MRB, 21, 1215 (1986) |
| Tungsten | $(Bi_2O_3)_{0.78}(WO_3)_{0.22}$ | 6.0 | 0.99 @ 550 | JAE, 3, 65 (1973) |
| Strontium | $(Bi_2O_3)_{0.8}(SrO)_{0.2}$ | 2.6 | 0.97 @ 550 | JAE, 2, 97 (1972) |
| Cadmium | $(Bi_2O_3)_{0.6}(CdO)_{0.4}$ | 25 | 0.0 @ 500 | JAE, 2, 97 (1972) |
| Lanthanum | $(Bi_2O_3)_{0.9}(La_2O_3)_{0.1}$ | 5.0 | 0.92 @ 550 | JAE, 2, 97 (1972) |
| Lanthanum | $(Bi_2O_3)_{0.85}(La_2O_3)_{0.15}$ | 8.1 | 0.96 @ 500 | JSSC, 39, 173 (1981) |
| Samarium | $(Bi_2O_3)_{0.9}(Sm_2O_3)_{0.1}$ | 5.1 | 1.0 @ 500 | JSSC, 39, 173 (1981) |
| Neodymium | $(Bi_2O_3)_{0.9}(Nd_3O_3)_{0.1}$ | 6.9 | 0.98 @ 500 | JSSC, 39, 173 (1981) |
| Erbium | $(Bi_2O_3)_{0.75}(Er_2O_3)_{0.25}$ | 3.9 | 1.02 @ 500 | JSSC, 39, 173 (1981) |
| Erbium | $(Bi_2O_3)_{0.8}(Er_2O_3)_{0.2}$ | 7.7 | 0.98 @ 500 | JAE, 10, 81 (1980) |
| Molybdenum | $(Bi_2O_3)_{0.6}(MoO_3)_{0.4}$ | 1.1 | 0.97 @ 600 | JAE, 7, 31 (1977) |
| Codolinium | $(Bi_2O_3)_{0.9}(Gd_2O_3)_{0.4}$ | 3.5 | 1.0 @ 600 | JAE, 5, 197 (1975) |
| Barium | $(Bi_2O_3)_{0.8}(BaO)_{0.2}$ | 5.2 | 0.97 @ 450 | JSSC, 15, 317 (1976) |
| Barium | $(Bi_2O_3)_{0.84}(BaO0_{0.16}$ | 15 | | JMS, 20, 3125 (1985) |
| Praeseodymium | $(Bi_2O_3)_{0.8}(Pr_2O_{11/3})_{0.2}$ | 1.9 | 0.98 @ 500 | JAE, 12, 235 (1982) |
| Praeseodymium | $(Bi_2O_3)_{0.9}(Pr_2O_{11/3})_{0.1}$ | 4.0 | | JAE, 12, 235 (1982) |
| Terbium | $(Bi_2O_3)_{0.8}(Tb_2O_{3.5})_{0.2}$ | 0.61 | 0.96 @ 500 | JAE, 15, 447 (1985) |
| Terbium | $(Bi_2O_3)_{0.9}(Tb_2O_{3.5})_{0.1}$ | 4.1 | 0.87 @ 500 | JAE, 15, 447 (1985) |

The first column in Table 1 is the stabilizing agent which may be an alkaline earth, a lanthanide or a transition metal. The second column is the composition of the solid solution which is reported to exhibit the highest conductivity for a given pairing of metal ions. The third column lists the reported ionic conductivity at the somewhat arbitrary temperature of 450° C. The barium stabilized phase, with a barium content of 15-20 mole percent of stabilizing oxide formula as written is one of the most conductive.

The fourth column in this table is the transference number for the oxide conduction at the stated temperature. The transference number for oxide conduction is the fraction of the current which is carried by oxide ions, instead of by semiconducting or metallic mechanism. In general, a useful solid electrolyte must have a transference number in excess of 95%, meaning that approximately 5% or less of the current is carried by non-electrolytic mechanisms. Note that all of the compositions except for cadmium and terbium meet this fundamental criterion. The zero transference number of the cadmium phase indicates that it is a pure electronic (not electrolytic) conducter.

The fifth column lists literature references. In Column 5, JES refers to Journal of the Electrochemical Society, JAE refers to Journal of Applied Electrochemistry, MRB refers to Materials Research Bulletin, JSSC refers to Journal of Solid State Chemistry, and JMS refers to Journal of Materials Science.

It is presently preferred to employ the bismuth baria rhombohedral system wherein the barium stabilized phase has a barium content of 15-25 mole percent of stabilizing oxide formula, preferably 15-20 mole percent, and most preferably 20 mole percent.

Ceria stabilized with a metal oxide wherein the metal ion has a valence of +2 or +3 may also be used in the practice of this intention as the ceramic phase of the solid electrolyte composite. Representative stabilizing agents are oxides of yttrium, scandium, gadolinium and other rare earth and alkaline earth matals.

Figure 4:
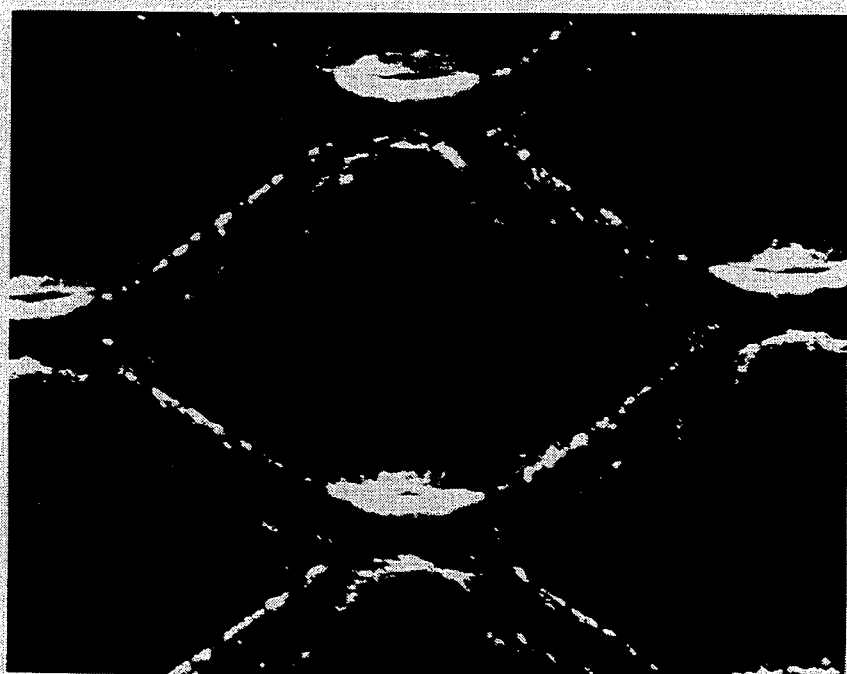
FIG. 4 is a 100× photomicrograph of the preferred embodiment of an open ductile array for the solid electrolyte ceramic composite employed in the practice of this invention.

As best shown in FIG. 4, a preferred embodiment of the ductile component of the solid electrolyte composite employed in the practice of this invention is an inter-supported, planar array of metallic ligaments forming a repeating diamond pattern. The line of sign openess of this array is about 65-70%. Ceramic volume fraction of the solid electrolyte ceramic composite composition is from 10% to 95%. The preferred ceramic volume fraction of the final ceramic composite is about 90%.

The preferred material for the ordered, ductile array is a single layer of an open mesh metal structure. Especially preferred are expanded metal foils such as Haynes 214 expanded metal foil. Especially preferred is an expanded metal foil produced in accordance with this invention from a solid sheet of Inconel 600 foil with an original thickness of 0.003".

The solid electrolyte composite employed in the practice of this invention is a thin sheet-like structure having a thickness of 0.01 inch or less. It is preferred that the composite have a thickness of 0.003 inch or less. While one of the retirements of structures in which the composite is used, including the oxygen generator module, is that the components including the electrolyte composite be of sufficient mechanical strength to withstand stresses to which they will be exposed, this will normally dictate the thickness required. If very large sheets not supported by the current pickups are employed, for example in the form of posts, mechanical strength retirements will increase and greater thickness will be required.

Generally speaking, the shape of the composite body is irrelevant to its operation. It may be square, rectangular, circular, pleated corrugated, and the like. For best results it is preferred that the composite body employed in the electrolytic cell, which forms the essential element of the oxygen generator of this invention, is at least 4 inches on a side, preferably 6 inches or more in diameter if round to provide an equivalent surface area. Size will depend upon the end application. Portable oxygen generators for medical or other personal use, such as for firefighters, would use relatively small cells. For large, industrial applications, composite bodies having dimensions of 1 to 2 meters or more per side may be employed.

Figure 5:
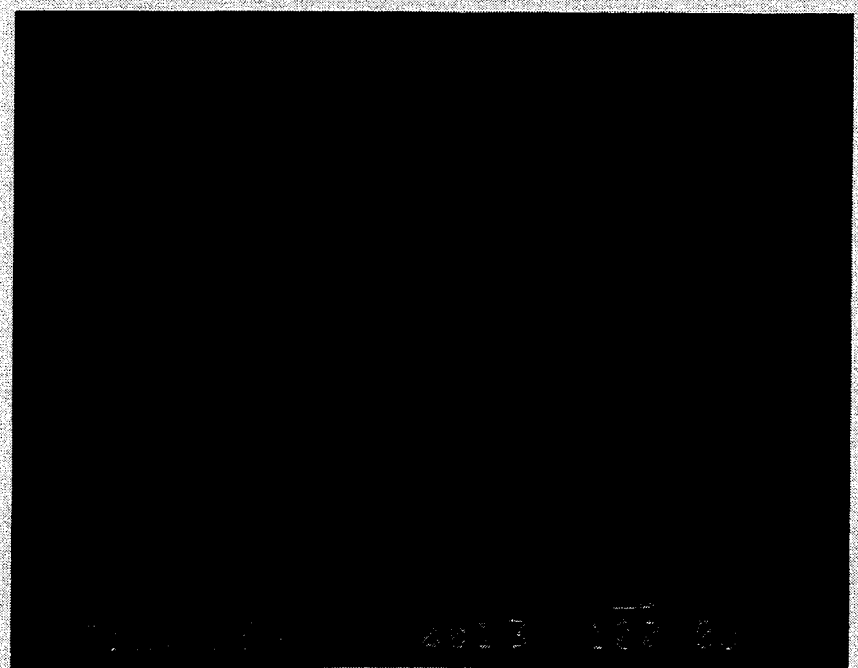
FIG. 5 is a 60× SEM of a preferred embodiment of solid electrolyte composite having a repeating pattern of the underlying diamond structure from the ductile array of FIG. 2.
Figure 8:
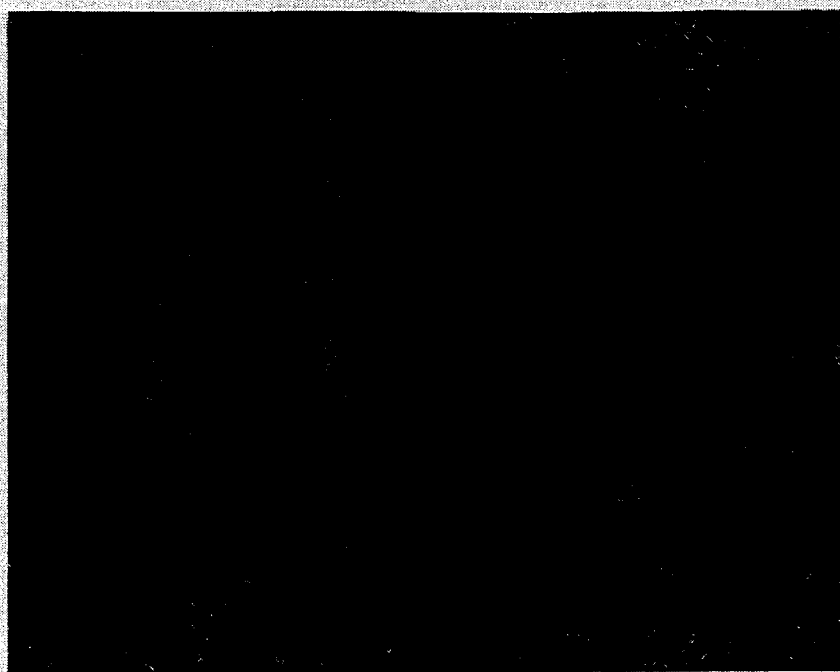
FIG. 8 is a photomicrograph of a section of the solid electrolyte of FIG. 5 after it had been repeatedly bent 180° (in half) and straightened to determine the effect of intentionally excessive mechanical abuse.

As shown in FIG. 5, in the solid electrolyte composite formulated in accordance with a preferred embodiment of the present invention, there is a repeating pattern of the underlying diamond structure of the ductile array. The EDX analysis of the interface between metal and solid electrolyte ceramic showed a "metal oxide" with the composition $CrNi_2O_x$. The EDX analysis of the metal ligaments was consistent with the published values of Inconel 600 while the bulk ceramic phase was consistent within the precision of the EDX unit with the intended solid solution of bismuth and barium oxides as shown in FIG. 8.

Figure 6:
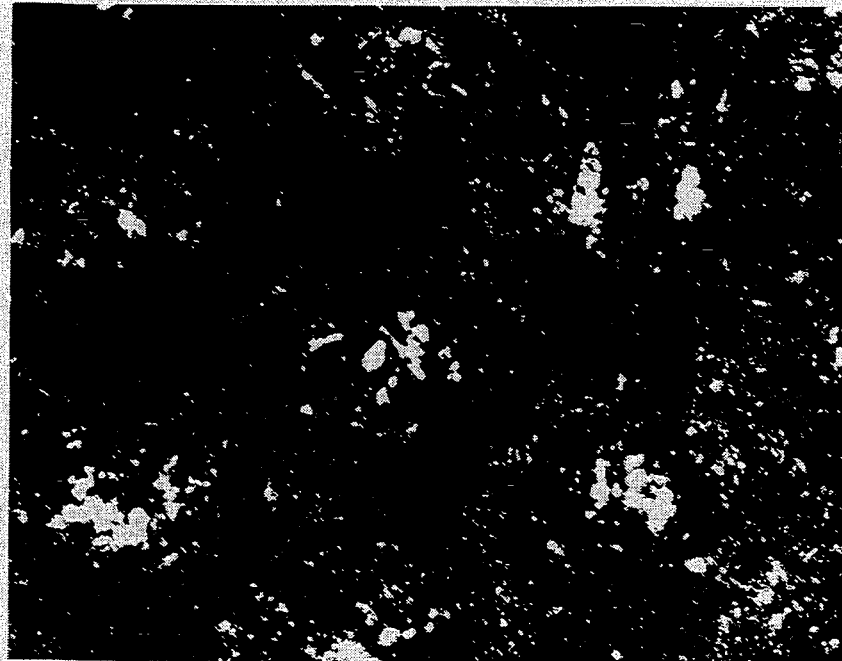
FIG. 6 is a 50× optical photomicrograph of a solid electrolyte composite material employed in the practice of this invention.

FIG. 6 is a 50× optical photomicrograph of a composite of this invention. The "diamonds" of ceramic oxide solid electrolyte with the interconnecting lines of metallic ligaments can be seen. Upon backlighting, the composite clearly showed its form with a yellow-orange transmitted light interrupted in a precise regular repeating array of opaque (metallic) lines. The optically transmitting regions were the diamond shaped ceramic filled subsections.

Figure 7:
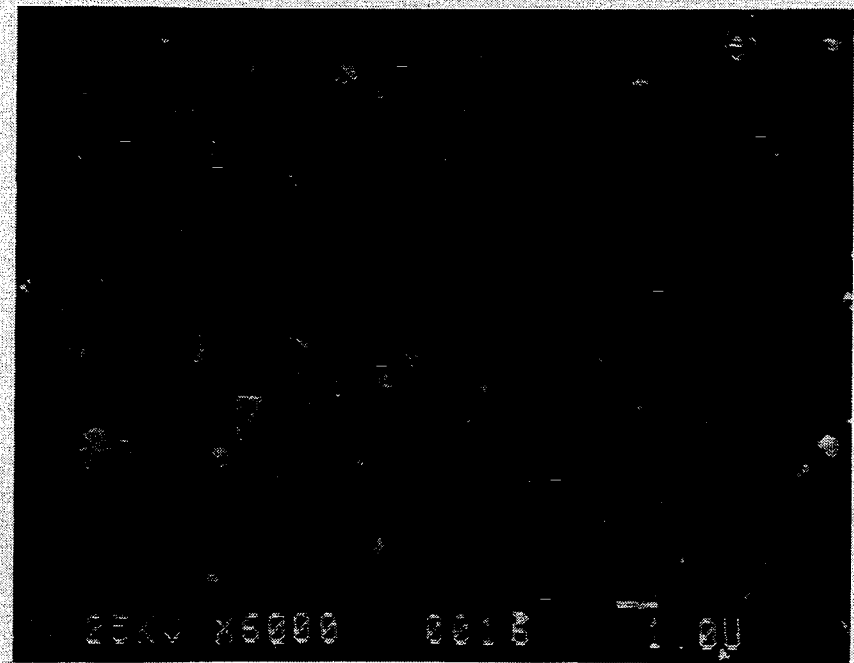
FIG. 7 is a 6000× SEM photomicrograph of a section of a preferred embodiment of a solid electrolyte employed in this invention.

FIG. 7 is a 6000× SEM photomicrograph of a section of the solid electrolyte prepared in accordance with Example 2. The white occlusions are unreacted nearly pure bismuth oxide.

The solid electrolyte composite of this invention was found to be quite flexible, capable of flexing out of plane by as much as 0.25 inch or more with finger tip pressure on a sample of about two inches in length. A sample was repeatedly bent to 180° (folded in half) and straigthened to examine the effect of such mechanical abuse.

FIG. 8 is a photomicrograph of such a sample. As can be seen, despite the extreme mechanical abuse, a resulting crack only formed along the line of maximum stress or fold line. However, there was no crack propagating away from the fold line, and the crack that did appear did not even extend within a given, unsupported ceramic diamond area. The same ceramic composition, outside of the composite structure, would shatter. Prior art composite structures would not withstand such abuse.

Figure 9:
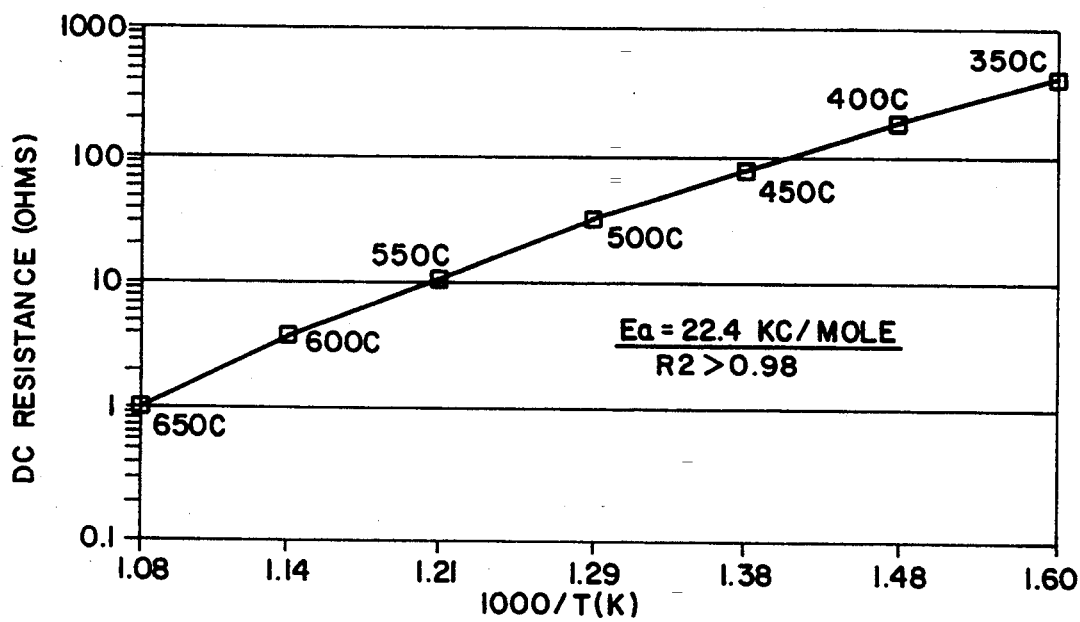
FIG. 9 is a graph of conductivity vs temperature of a solid electrolyte composite using a 15 mole percent baria solution in bismuth oxide.
Figure 10:
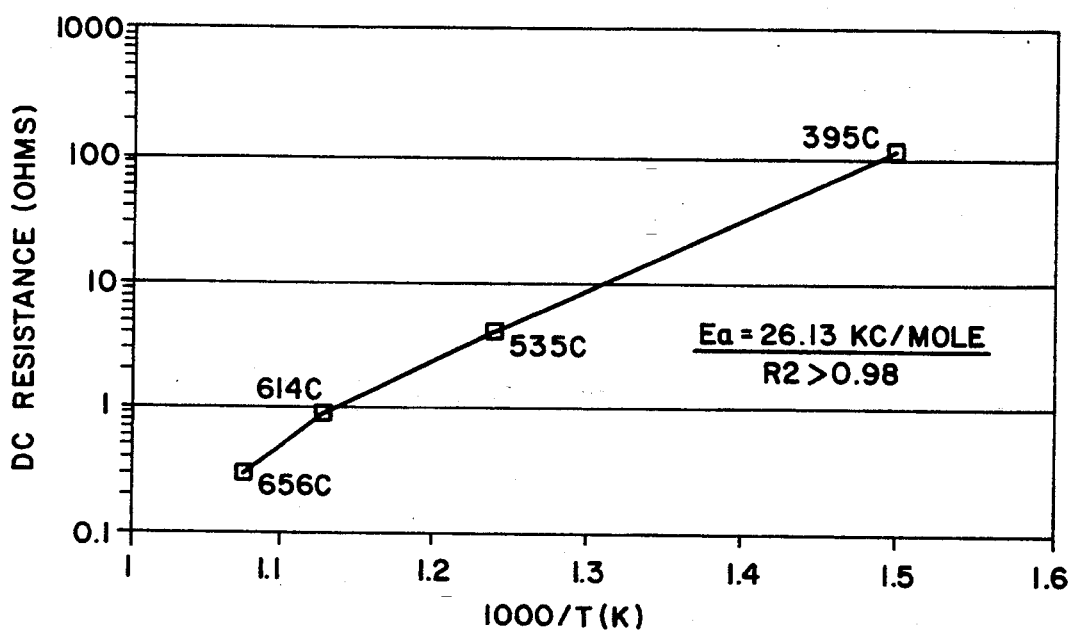
FIG. 10 is a graph of conductivity vs. temperature of a 20 mole percent solution of baria in bismuth oxide.

The cell of FIG. 3 was tested under the following conditions. Cell 30 comprised a symmetric "sandwich" with the ionically conductive solid electrolyte composite as the center layer 40. On either side of the solid electrolyte center layer are mixed conductive layers 41 which are coated with electronically conductive porous metallic layers 42. Woven Inconel 600 cloth was coated with commercial silver based paste to act as current collector and to allow for the passage of gases in passageways 32 and 33 which serve as the oxygen and air plenums respectively. The plenum walls were ⅛ inch thick sheet of Haynes 214 alloy to serve as current pickups. A single fine platinum wire was placed on the cathodic side of the cell composite in contact with the electrolyte but not in direct electrical contact with the electrodes or the metal current collectors of pickup plates. There was static air on both sides of the sample at the beginning of each test. The cathode side became depleted in oxygen while the anodic side oxygen partial pressure increased. The test cell was placed in an electric Nichrome wound muffle furnace and the temperature was raised to the appropriate level. A thermocouple, independent of the furnace thermocouple, was placed in direct contact with the test array at all times. Voltage was applied with a small 15 amp DC power supply from Darrah Electronics. The voltages, currents, and DC resistivities were read using digital multimeters. FIGS. 9 and 10 are graphs plotting data points measured with the above apparatus.

FIGS. 9 and 10 depict show the DC conductivity versus inverse temperature behavior of composites of this invention having 15 and 20 mole percent of BaO in the ceramic composition phase respectively. Solid electrolytes should exhibit a linear relationship between the log of the conductivity (resistivity) and the inverse Kelvin temperature.

FIG. 9 depicts data taken on a solid electrolyte composite of this invention prepared from a 15 mole percent baria (BaO) solution in bismuth oxide ($Bi_2O_3$). The data were taken over a temperature range of three hundred degrees Kelvin and includes the operating temperature range of the oxygen generator of this invention. The slope of the data is about twenty two kilocalories/mole which is consistent with the published literature values for the bulk ceramic, The least squares correlation coefficient for seven data points over the three hundred degree range is >0.98.

FIG. 10 is a related data curve taken on a composite produced utilizing a 20 mole percent solution of baria in bismuth oxide. The 15% solid electrolyte showed a small but finite level of the monoclinic phase (by XRD), while the 20% baria solution showed only the pure rhobohedral phase at the precision level of XRD. The 20% curve (FIG. 10) exhibited a somewhat steeper conductivity vs. temperature slope than the 15% baria ceramic composite. This results in an energy of activation for the 20% baria material of about 26 KC/mole, slightly higher that the 15% material. At the highest temperature measured, the curve for the 20% baria material may be exhibiting the change in slope as reported by Suzuki [JMS, 20, 1985, 3125] and others for the bulk ceramic.

Figure 11:
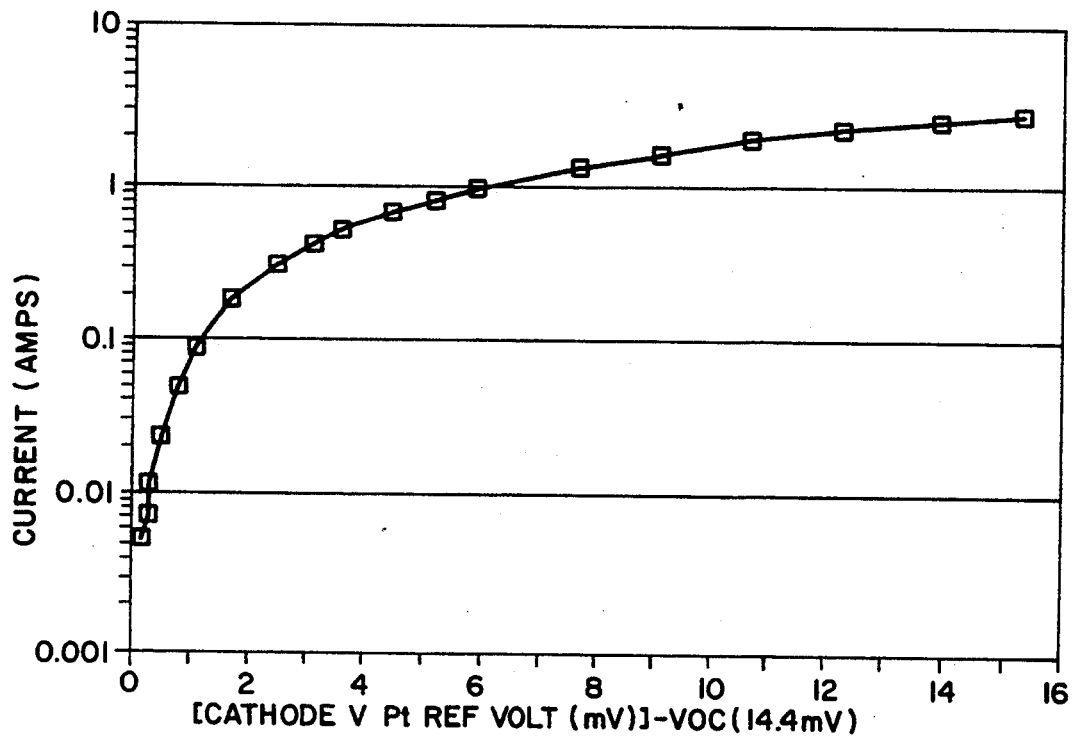
FIG. 11 is a graph of voltage vs. current of the electrolyte of FIG. 9.
Figure 12:
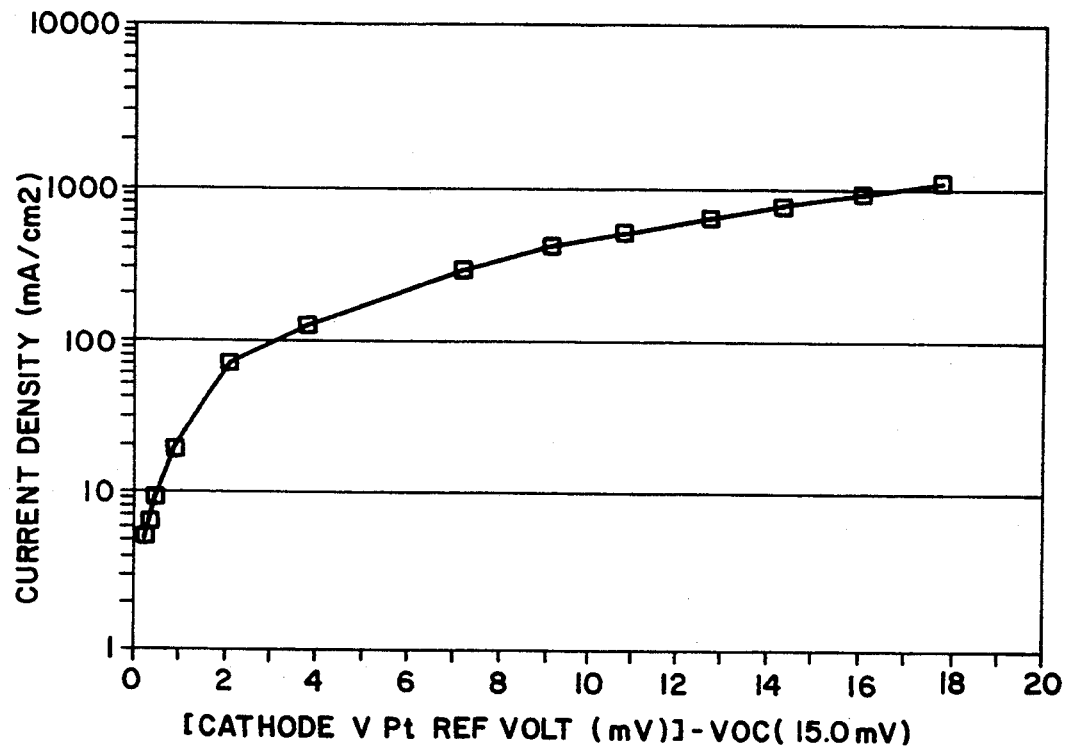
FIG. 12 is a graph of voltage vs. current of the electroyte of FIG. 10.

FIGS. 11 and 12 depict the voltage versus current behavior of these electrolytic ceramic composites. The vertical axis is the logarithm of the current in amperes or in current density. The horizontal axis is the voltage between the cathodic electrode and the platinum reference electrode less the open circuit potential of 14–15 mV depending on temperature.

Generally speaking, the high melting temperature electrolyte composites employed in the practice of this invention are prepared by preparing a slurry of fine metal oxide powder having a particle size under 1 micron to form a doughy slurry, adding an organic binder, preferably under 0.25% of a binder such as polyvinylalcohol, pouring or otherwise distributing the ceramic phase solution over the ductile support array to be embedded therein, firing in a reducing or inert atmosphere to approximately 1000° to 1400° C., preferably 1200° to 1350° C. and most preferably 1300° to 1350° C. for from 1 to 24 hours, cooling and repeating the cycle until there is >90% density in the ceramic.

It is especially preferred to anneal the composite under a directed energy source such as a carbon dioxide laser or electron beam. In this way, the ceramic can be heated above its melting point, permitting it to flow evenly around the ductile array, while the metal remains under its melting point. Beam rastering rates of approximately 1 inch/sec work especially well.

The following examples further illustrate the invention.

EXAMPLE 1

A slurry of a molten hydrate melt of $(CeNO_3)_3 \cdot 6H_2O$, $Gd(NO_3)_3 \cdot H_2O$ and $Ce_{0.8}Gd_2O_{1.9}$ was applied to Inconel 600 mesh (60 mesh) stainless steel, suspended in a furnace with 0.008 inch Inconel wire and fired to approximately 650° C. After cooling, the composite was laser annealed using a $CO_2$ laser having a 10.6 wavelength, 600 W, 3/8 inch by 0.005 inch. The ceramic melted, flowed and refroze without melting the metal suport matrix. The annealing was done under flowing argon. A sample of composite was held on a computer controlled table and rastered under the $CO_2$ laser beam at a rate of 1 inch/sec. Very slow rates vaporized the sample and faster rates insufficiently melted the ceramic.

EXAMPLE 2

A bismuth baria solid electrolyte composite wherein the ceramic phase contains 20 mole percent baria was prepared as follows.

Bismuth oxide ($Bi_2O_3$, 150 g) was mixed with Ba(-$NO_3$) (11.7 g) and $Bi_2O_3$ (21 g) $[Bi_2O_3]_{0.72}(BaO)_{0.28}$ and poured into an alumina tray containing 340 g of 16% BaO. Upon melting, the final composition is $(Bi_2O_3)_{0.80}$-$(BaO)_{0.20}$. The mixture was well stirred and heated to a temperature of 900° C. for about 1½ hours, then cooled to 860° C. A ductile array of Inconel 600 expanded metal foil having a line-of-sight openess of about 70% and forming a regular, structured, repeating diamond pattern was preoxidized by heating to approximately 700° C. for about 1½ hours in air. The preoxidized metal support or ductile array way dipped into the liquid ceramic phase to coat the ductile array with the ceramic phase, cooled and annealed at a temperature of 780° C.

EXAMPLE 3

On a 90 mm diameter Buchner funnel there was placed a sheet of Whatman 541 filter paper. The funnel assembly was covered with a ⅛ inch thick neoprene gasket sheet having a 90 mm diameter. The neoprene gasket had a rectangular hole somewhat smaller than the composite sample. A second piece or rubber neoprene was placed in the hole on top of the Whatman 541 sheet to physically support the composite without sealing. The system, without a composite sheet, was wetted with ethanol and allowed to set. The composite prepared above was placed over the neoprene hole and sealed in place with a neoprene gasket.

A thin layer of the above bismuth baria slurry was painted on and allowed to dry for about 5 minutes. The sample was dried at 60° C., recoated on the opposite side and dried again. The composite was then fired at 700° C. in air for about 20 hours. A second coat of the bismuth baria slurry was applied and the composite fired at 700° C. for 15 hours in air. A third coat was applied and fired at 700° C. in air for 1 week.

EXAMPLE 4

A solid electrolyte composite was prepared following the method of Example 3 with the following modifications. The surface of the composite was painted with a slurry of BiBaOx and 20% polyethyleneimine (50% aqueous) under suction in a Buchner funnel. The composite was dried at 125° C., the opposite side coated and dried as above. The composite was placed under a weight and fired in air at 680° C. for 20 hours, cooled to room temperature and both sides were painted with 1% aqueous polyethylenimine and partially dried. Both faces of the composite were painted with silver palladium paint and dried at 150°–200° C. A second coat of silver palladium paint was applied and the composite fired at 350° C. for 1 hour in air and cooled to room temperature. The composite cell was placed in a furnace under a weight and the temperature raised to 700° C., held for 10 minutes, reduced to about 550° C., and then heated in air at 700° C. for 14 hours.

EXAMPLE 5

A cell body was constructed from a section of standard schedule 40 three inch SS316 pipe with external standard threads cut in one end. A planar disc of Inconel 600 expanded metal foil was tack welded on the end without the threads. The expanded foil disk was five inches in diameter. The outer one inch was cut radially into tabs approximately 0.5 inches centered over the unthreaded end of the pipe section and the tabs were bent down over the exterior sides of the pipe. The tabs were tacked in place with five welds of approximately 1/16 inch in diameter arranged in a three/two pattern with the three at the far (wider) end of the tab. Additional welds were tacked every two or three mm along the upper rim of the pipe at approximately $\frac{1}{8}$ in intervals.

Following the method of Example 2, a ceramic phase of bismuth baria oxide solid solution was prepared and melted in an Inconel 600 deep drawn crucible. The crucible was placed in an oven and heated to 925° C. for about 30 minutes. The crucible was periodically swirled to insure & chemically homogeneous melt and the temperature was reduced to approximately 850° C.

During the 30 minute thermal hold of the above procedure, the cell body was placed in the oven along side the crucible to heat it to the temperature of the melt. This is important because if cold metal is dipped into the melt, the relatively large thermal mass of metal cools the melt to below the solidus temperature which results in the melt freezing and the pipe section fusing to the frozen ceramic mass. It generally requires a minimum of 30 minutes to raise the metal to the appropriate temperature.

The furnace door was opened and the metal section grasped with long tongs and dipped into the open-topped crucible containing the melt. The cell was promptly removed from the furnace and placed on a concrete surface to cool. The composite top of the cell cooled to room temperature within seconds, although the pipe section took several minutes to cool. The cell unit was examined for pinholes and none were found.

Silver palladium paste was applied to the interior and exterior surfaces of the composite. The paste was dried at 110° C. for 20 minutes and fired at 700° C. for an additional thirty minutes. Several coats were applied using this procedure.

The room temperature electrical resistance between the interior coat (the anode, oxygen evolution site) and the exterior coat (the cathode, the oxygen dissolution rate) was >30,000,000 ohms, the limit or the DMMs. This indicates the electrodes were not short-circuited. Electrical resistance between any two points on a given electrode at room temperature was about 0.2 ohms or less.

The exterior electrode was approximately two inches in diameter and did not make direct electrical contact with the pipe. The silver paste of the interior electrode was intentionally spread onto the interior walls of the pipe, making an electrical connection between the housing and the interior electrode. There was no measurable room temperature electrical conductivity between the pipe and the exterior electrode.

A SS316 reducing union piece was then threaded onto the open end of the pipe section using high temperature thread sealant. The small end of the reducing union was connected to $\frac{1}{8}$ inch stainless steel tubing using a SS 316 swagelock adapter. The $\frac{1}{8}''$ tubing extended out of a hole in the top of the furnace. About 18 inch of small diameter tubing extended out of the furnace. The "cold" end of the SS tube was connected to a section, about 3 feet long, of standard $\frac{1}{8}$ inch i.d. Tygon tubing. This was the gas circuit.

When electrical power was applied to the cell, at temperatures of about 650° C., oxygen was produced at the anode. This was detected by immersing the end of the tygon tubing in a small dish of water and seeing a steady stream of bubbles. In the absense of electrical power, the flow of oxygen gas (bubbles) ceased.

The oxygen generator system of the present invention has a wide variety of applications. It can be fabricated into a light-weight, portable unit for medical use or use by firefighters and other individuals who are working in situations where an independent oxygen supply is needed. It can be fabricated into large industrial units to supply oxygen requirements in industrial processes. It can be used as an oxygen source for operations such as welding. It is versatile, its only moving part is a fan, it does not require replacement of consumables such as hydrogen peroxide or catalyst, and can continuously generate a supply of oxygen for prolonged periods of time. It can be fabricated into any desired size or shape to meet the desired application.

The invention claimed is:

1. An oxygen welding unit which generates its oxygen needs without an external oxygen source, said welding unit comprising: a housing, air ingress means associated within said housing, an oxygen generating module disposed within said housing, air intake means, oxygen egress means and spent air egress means, said oxygen generating module comprising a first solid electrolyte composite cell, said cell having a center sheet of a flexible, ductile solid electrolyte composite, said flexible, ductile, solid electrolyte composite comprising a regular, ordered, continuous, repeating array of ductile interconnected metallic ligaments in intimate contact with and substantially surrounding by an ionically conductive ceramic matrix; said flexible ductile composite sheet having an upper surface and an opposing lower surface, a layer of electronically conductive, gas porous material coating each surface of said ductile composite sheet where a cathode is formed on one of said surfaces and an anode is formed on the opposing surface of said cell; means for supplying power to said oxygen generating module whereby when air is passed through said oxygen generating module, the air is separated into oxygen and depleted air; an oxygen conveyor assembly having an entry open end, an exit port and fluid-tight side walls, said entry open end connected in fluid tight engagement with said oxygen generator module; means for conveying fuel to said oxygen generator module comprising an entry open end, an exit port and fluid-tight side walls, the entry end in fluid-tight attachment to a fuel source, and the exit port mixedly attached to the exit port of the oxygen module; and means for regulating the oxygen gas and fuel delivered at the exit port when gas and fuel are delivered from the oxygen generator and the fuel supply reservoir whereby when the combined oxygen and fuel stream is ignited, a welding flame is obtained.

2. An oxygen welding unit according to claim 1 which cooperates with an external fuel source.

3. An oxygen welding unit according to claim 1 additionally comprising a fuel reservoir.

4. An oxygen welding unit according to claim 1 wherein said flexible ductile solid electrolyte composite cell additionally comprises a layer of mixed ionic and electronic conductive material coating each of said surfaces of the center sheet between said surfaces and said anode and cathode.

5. An oxygen welding unit of claim 1 wherein said ductile metallic array is an expanded metal foil, woven metal, braided metal fibers or metal mesh.

* * * * *